US007271825B2

(12) United States Patent
Dara-Abrams (10) Patent No.: US 7,271,825 B2
(45) Date of Patent: Sep. 18, 2007

(54) KINESIOLOGICAL MODEL-BASED GESTURAL AUGMENTATION OF VOICE COMMUNICATION

(75) Inventor: Joseph Alexander Dara-Abrams, Los Altos, CA (US)

(73) Assignees: Sony Corporation, Shinagawa, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 10/982,003

(22) Filed: Nov. 4, 2004

(65) Prior Publication Data

US 2006/0092270 A1 May 4, 2006

(51) Int. Cl.
*H04N 7/14* (2006.01)
(52) U.S. Cl. .................. 348/14.01; 379/93.17
(58) Field of Classification Search .. 348/14.01–14.16; 709/204; 379/93.08, 93.13, 93.17, 93.28; 463/7, 8, 40, 41, 42; 340/573.1
See application file for complete search history.

(56) References Cited

U.S. PATENT DOCUMENTS

| | | | | |
|---|---|---|---|---|
| 5,463,616 A | * | 10/1995 | Kruse et al. ............. | 379/93.08 |
| 5,685,775 A | * | 11/1997 | Bakoglu et al. ............ | 463/41 |
| 5,991,085 A | * | 11/1999 | Rallison et al. ............ | 359/630 |
| 6,313,864 B1 | * | 11/2001 | Tabata et al. ............ | 348/14.02 |
| 6,583,808 B2 | * | 6/2003 | Boulanger et al. ....... | 348/14.09 |
| 6,795,107 B1 | * | 9/2004 | Neal et al. ............. | 348/14.08 |
| 6,867,797 B1 | * | 3/2005 | Pound .................... | 348/14.12 |
| 6,909,453 B2 | * | 6/2005 | Mochizuki et al. ........ | 348/14.1 |
| 7,024,228 B2 | * | 4/2006 | Komsi et al. ............. | 455/566 |
| 2002/0021407 A1 | * | 2/2002 | Elliott ....................... | 351/158 |
| 2003/0125099 A1 | * | 7/2003 | Basson et al. .............. | 463/7 |
| 2004/0130614 A1 | * | 7/2004 | Valliath et al. .......... | 348/14.01 |
| 2004/0201666 A1 | * | 10/2004 | Matsuo et al. ........... | 348/14.02 |
| 2005/0110867 A1 | * | 5/2005 | Schulz .................... | 348/14.05 |
| 2005/0264647 A1 | * | 12/2005 | Rzeszewski et al. ..... | 348/14.02 |
| 2006/0005156 A1 | * | 1/2006 | Korpipaa et al. .......... | 717/100 |
| 2006/0052109 A1 | * | 3/2006 | Ashman et al. ............. | 455/440 |

\* cited by examiner

*Primary Examiner*—Stella Woo
(74) *Attorney, Agent, or Firm*—Haverstock & Owens LLP (57) ABSTRACT

A sending conversant uses a sending communication device to transmit voice and body state information over a communication network to a receiving communication device used by a receiving conversant. Model based rendering is used such that the model is transferred from the sending conversant to the receiving conversant along with the transmitted data. The sending device includes means for sensing the body state of the sending conversant, collected as body state measurements. The sending communication device also includes means for detecting speech uttered by the sending conversant, such as an audio microphone. The detected speech and body state measurements are encoded in a temporally synchronized manner and multiplexed into a communication signal which is transmitted to the receiving device.

113 Claims, 5 Drawing Sheets

*Fig. 1*

(PRIOR ART)

KINESIOLOGICAL MODEL-BASED GESTURAL AUGMENTATION OF VOICE COMMUNICATION

FIELD OF INVENTION

The present invention relates to the field of communications devices. More particularly, the present invention relates to the field of communications devices which augment verbal communications by also measuring and transmitting aspects of the user's posture and body motions.

BACKGROUND

When two or more people engage in non face-to-face verbal communication, for example via standard telephone, cellular telephone, or communication PDA (personal digital assistant), they do not have access to visual clues that their partner or partners in conversation may be presenting. Such visual clues can be considered as visually represented portions of the conversation. Examples of such visual clues include facial expressions, hand and finger gestures, body stance, and gestural motion. Such visual representations are used when a conversant is speaking as well as listening, for example to indicate attention, interest, agreement, and the like. One such particular body-level gestural communication component is the bow or head nod of many Asiatic cultures. Such gestures are often used to implicitly indicate significant social relationships between communicating partners. However, gestures and their associated visual representations cannot be communicated using conventional voice-only telecommunications devices, thereby resulting in reduced effectiveness of communication.

SUMMARY

A sending conversant uses a sending communication device to transmit voice and body state information over a communication network to a receiving communication device used by a receiving conversant. The sending device includes means for sensing the body state of the sending conversant, collected as body state measurements. The sending communication device also includes means for detecting speech uttered by the sending conversant, such as an audio microphone. The detected speech and body state measurements are encoded and multiplexed into a communication signal which is transmitted to the receiving device.

In one aspect, a communication device communicates speech and body states of a conversant. The communication device includes an input/output interface that receives a first voice signal and first body state measurements from a first conversant using the communication device, an encoder circuit that converts the first voice signal and the first body state measurements received by the input/output interface into first voice data and first body state data, a decoder circuit that converts second voice data and second body state data into a second voice signal and second body state measurements, wherein the second voice data and the second body state data are received by the communication device from a second communication device used by a second conversant, a body state maintenance circuit to generate a body state model according to body-type framework model and the second body state measurements, wherein the body state model represents a body position of the second conversant, wherein the input/output interface audibly provides the second voice signal to the first conversant and visually provides a visual representation of the body state model to the first conversant. The body-type framework model is generated according to body-type framework data received from the second communication device. The body-type framework model comprises a general speaker body-type framework model indicative of generalized body specifications. The body-type framework data includes an indicator signifying the general speaker body-type framework model, and upon receiving the indicator, the communication device utilizes a locally stored version of the general speaker body-type framework model. The general speaker body-type framework model is loaded during manufacturing of the communication device or loaded during a device configuration upload. Alternatively, the body-type framework model comprises a speaker-specific body-type framework model representative of speaker-specific body specifications corresponding to the second conversant. The visual representation of the body state model is generated by a visual rendering circuit which accesses the body state model. The communication device further comprises a transceiver circuit to transmit the first voice data and the first body state data and to receive the second voice data, the second body state data, and a body-type framework data corresponding to the second communication device. The transceiver further comprises a multiplexer to multiplex the first voice data and the first body state data prior to transmission. The transceiver further comprises a de-multiplexer to de-multiplex a received multiplexed transmission, the multiplexed transmission including the second voice data and the second body state data. The body-type framework model comprises a general speaker body-type framework model representative of generalized body specifications. The general speaker body-type framework model is loaded during manufacturing of the communication device or loaded during a device configuration upload. The body-type framework model comprises an indicator indicating the use of a general speaker body-type framework model such that the second communication device, upon receiving the indicator, utilizes a locally stored version of the general speaker body-type framework model. The body-type framework model comprises a speaker-specific body-type framework model representative of speaker-specific body specifications corresponding to the conversant. The speaker specific body-type framework model adds kinesiological model measurements to a general speaker body-type framework model representative of generalized body specifications. The body-type framework model is transmitted from the second communication device to the first communication device at the start of a communication between the first conversant and the second conversant. The communication device further comprises one or more sensors to measure the first body state measurements. At least one sensor is selected from the group consisting of a tilt sensor, a flux gate electronic compass, a microelectromechanical system accelerometer, a microelectromechanical system rate gyro grouping, and a tactile pressure sensor. The input/output interface further comprises a means for receiving body state measurement signals from one or more external sensors. Alternatively, the first body state measurements are entered by the first conversant using a keyboard. Alternatively, the communication device comprises a video game system. The video game system comprises a video game console coupled to a display device. The video game system comprises a handheld device.

In another aspect, a network of devices communicates speech and body states of a conversant. The network of devices includes a communication network, and one or more communication devices coupled together via the communication network, wherein each communication device comprises an input/output interface that receives a first voice signal and first body state measurements from a first conversant using the communication device, an encoder circuit that converts the first voice signal and the first body state measurements received by the input/output interface into first voice data and first body state data, a decoder circuit that converts second voice data and second body state data into a second voice signal and a second body state measurements, wherein the second voice data and the second body state data are received by the communication device from a second communication device used by a second conversant, a body state maintenance circuit to generate a body state model according to a body-type framework model and the second body state measurements, wherein the body state model represents a body position of the second conversant, wherein the input/output interface audibly provides the second voice signal to the first conversant and visually provides a visual representation of the body state model to the first conversant. The body-type framework model is generated according to body-type framework data received from the second communication device. The body-type framework model comprises a general speaker body-type framework model indicative of generalized body specifications. The body-type framework data includes an indicator signifying the general speaker body-type framework model, and upon receiving the indicator, the communication device utilizes a locally stored version of the general speaker body-type framework model. The general speaker body-type framework model is loaded during manufacturing of the communication device or loaded during a device configuration upload. Alternatively, the body-type framework model comprises a speaker-specific body-type framework model representative of speaker-specific body specifications corresponding to the second conversant. The visual representation of the body state model is generated by a visual rendering circuit which accesses the body state model. Each communication device further comprises a transceiver circuit to transmit the first voice data and the first body state data, and to receive the second voice data, the second body state data, and a body-type framework data corresponding to the second communication device. The transceiver further comprises a multiplexer to multiplex the first voice data and the first body state data prior to transmission. The transceiver further comprises a de-multiplexer to de-multiplex a received multiplexed transmission, the multiplexed transmission including the second voice data and the second body state data. The body-type framework model comprises a general speaker body-type framework model representative of generalized body specifications. The general speaker body-type framework model is loaded during manufacturing of the communication device or loaded during a device configuration upload. The body-type framework model comprises an indicator indicating the use of a general speaker body-type framework model such that the second communication device, upon receiving the indicator, utilizes a locally stored version of the general speaker body-type framework model. The body-type framework model comprises a speaker-specific body-type framework model representative of speaker-specific body specifications corresponding to the second conversant. The speaker specific body-type framework model adds kinesiological model measurements to a general speaker body-type framework model representative of generalized body specifications. The body-type framework model is transmitted from the second communication device to the first communication device at the start of a communication between the first conversant and the second conversant. Each communication device further comprises one or more sensors to measure the first body state measurements. At least one sensor is selected from the group consisting of a tilt sensor, a flux gate electronic compass, a microelectromechanical system accelerometer, a microelectromechanical system rate gyro grouping, and a tactile pressure sensor. The input/output interface further comprises a means for receiving body state measurement signals from one or more external sensors. Alternatively, the first body state measurements are entered by the first conversant using a keyboard. Alternatively, the communication device comprises a video game system. The video game system comprises a video game console coupled to a display device. The video game system comprises a handheld device.

In yet another aspect, a method of communicating speech and body states of a first conversant to a second conversant over a communications network includes receiving a first voice signal and first body state measurements from the first conversant using a first communication device, converting the first voice signal and the first body state measurements into first voice data and first body state data, converting second voice data and second body state data into a second voice signal and second body state measurements, wherein the second voice data and the second body state data are received by the first communication device from a second communication device used by the second conversant, generating a body state model according to a body-type framework model and the second body state measurements, wherein the body state model represents a body position of the second conversant, and audibly providing the second voice signal to the first conversant and visually providing a visual representation of the body state model to the first conversant. The second voice signal and the body state model are temporally synchronized and provided to the first conversant. The method further comprises generating the body-type framework model according to body-type framework data received from the second communication device. Generating the body-type framework model comprises generating a general speaker body-type framework model indicative of generalized body specifications. Generating the body-type framework data includes generating an indicator signifying the general speaker body-type framework model. The method further comprises the communication device utilizing a locally stored version of the general speaker body-type framework model upon receiving the indicator. The method further comprises loading the general speaker body-type framework model manufacturing of the communication device or loading during a device configuration upload. Alternatively, generating the body-type framework model includes generating a speaker-specific body-type framework model representative of speaker-specific body specifications corresponding to the second conversant. The method further comprises multiplexing the first voice data and the first body state data prior to transmitting to the second communication device. The method further comprises de-multiplexing a received multiplexed transmission, the multiplexed transmission including the second voice data and the second body state data. Generating the body-type framework model comprises generating a general speaker body-type framework model representative of generalized body specifications. The method further comprises loading the general speaker body-type framework model during manufacturing of the communication device or loading during a device configuration upload. Generating the body-type framework model comprises generating an indicator indicating the use of a general speaker body-type framework model. The method further comprises the second communication device utilizing a locally stored version of the general speaker body-type framework model upon receiving the indicator. Generating the body-type framework model comprises generating a speaker-specific body-type framework model representative of speaker-specific body specifications corresponding to the second conversant. The speaker specific body-type framework model adds kinesiological model measurements to a general speaker body-type framework model representative of generalized body specifications. The method further comprises transmitting the body-type framework model from the second communication device to the first communication device at the start of a communication between the first conversant and the second conversant. The method further comprises using one or more sensors to measure the first body state measurements. Alternatively, the method further comprises entering the body state measurements using a keyboard. Alternatively, the first communication device and the second communication device each comprise a video game system. The video game system comprises a video game console coupled to a display device. The video game system comprises a handheld device.

In still yet another aspect, a network of devices communicates speech and body states of a conversant. The network of devices includes a communication network, and one or more video game systems coupled together via the communication network, wherein each video game system comprises an input/output interface that receives first voice signal and first body state measurements from a first conversant using the video game system, an encoder circuit that converts the first voice signal and the first body state measurements received by the input/output interface into first voice data and first body state data, a decoder circuit that converts second voice data and second body state data into a second voice signal and second body state measurements, wherein the second voice data and the second body state data are received by the video game system from a second video game system used by a second conversant, a body state maintenance circuit to generate a body state model according to the body-type framework model and the second body state measurements, wherein the body state model represents a body position of the second conversant, wherein the input/output interface audibly provides the second voice signal to the first conversant and visually provides a visual representation of the body state model to the first conversant. The body-type framework model is generated according to body-type framework data received from the second video game system. The body-type framework model comprises a general speaker body-type framework model indicative of generalized body specifications. The body-type framework data includes an indicator signifying the general speaker body-type framework model, and upon receiving the indicator, the video game system utilizes a locally stored version of the general speaker body-type framework model. The general speaker body-type framework model is loaded during manufacturing of the video game system or loaded during a device configuration upload. Alternatively, the body-type framework model comprises a speaker-specific body-type framework model representative of speaker-specific body specifications corresponding to the second conversant. The visual representation of the body state model is generated by a visual rendering circuit which accesses the body state model. Each video game system further comprises a transceiver circuit to transmit the first voice data and the first body state data, and to receive the second voice data, the second body state data, and body-type framework data corresponding to the second video game system. The transceiver further comprises a multiplexer to multiplex the first voice data and the first body state data prior to transmission. The transceiver further comprises a de-multiplexer to de-multiplex a received multiplexed transmission, the multiplexed transmission including the second voice data and the second body state data. The body-type framework model comprises a general speaker body-type framework model representative of generalized body specifications. The general speaker body-type framework model is loaded during manufacturing of the video game system or loaded during a video game system configuration upload. The body-type framework model comprises an indicator indicating the use of a general speaker body-type framework model such that the second video game system, upon receiving the indicator, utilizes a locally stored version of the general speaker body-type framework model. The body-type framework model comprises a speaker-specific body-type framework model representative of speaker-specific body specifications corresponding to the second conversant. The speaker specific body-type framework model adds kinesiological model measurements to a general speaker body-type framework model representative of generalized body specifications. The body-type framework model is transmitted from the second video game system to the first video game system at the start of a communication between the first conversant and the second conversant. Each video game system further comprises one or more sensors to measure the first body state measurements. At least one sensor is selected from the group consisting of a tilt sensor, a flux gate electronic compass, a microelectromechanical system accelerometer, a microelectromechanical system rate gyro grouping, and a tactile pressure sensor. The input/output interface further comprises a means for receiving body state measurement signals from one or more external sensors. Alternatively, the body state measurements are entered by the first conversant using a keyboard. The video game system comprises a video game console coupled to a display device. The video game system comprises a handheld device. The communication network comprises the internet.

In another aspect, a video game system communicates speech and body states of a video game player. The video game system includes an input/output interface that receives a voice signal and body state measurements from a video game player using the video game console, an encoder circuit that converts the voice signal and the body state measurements received by the input/output interface into voice data and body state data, a body state maintenance circuit to generate a body state model according to the body-type framework model and second body state data, wherein the body state model represents a body position of the video game player, wherein the input/output interface provides a visual representation of the body state model to the video game player. The body-type framework model comprises a general speaker body-type framework model indicative of generalized body specifications. The general speaker body-type framework model is loaded during manufacturing of the video game system or loaded during a device configuration upload. Alternatively, the body-type framework model comprises a speaker-specific body-type framework model representative of speaker-specific body specifications corresponding to the video game player. The visual representation of the body state model is generated by a visual rendering circuit which accesses the body state model. The video game system further comprises one or more sensors to measure the first body state measurements. At least one sensor is selected from the group consisting of a tilt sensor, a flux gate electronic compass, a microelectromechanical system accelerometer, a microelectromechanical system rate gyro grouping, and a tactile pressure sensor. The input/output interface further comprises a means for receiving body state measurement signals from one or more external sensors. Alternatively, the body state measurements are entered by the video game player using a keyboard. The video game system comprises a video game console coupled to a display device. The video game system comprises a handheld device.

In yet another aspect, a communication device comprises a voice encoding mechanism that converts a voice utterance of a first conversant into first voice data, the first voice data being for receipt and rendering for audible output by a second communication device operated by a second conversant, a speaker kinesiological modeling data structure that provides a first kinesiologically-based model and a body state and data encoding mechanism that uses the first kinesiologically-based model to convert a body state measurement associated with the first conversant into first kinesiological data, the first kinesiological data being for receipt and rendering for visual output by the second communication device. The communication device further comprises a voice decoding mechanism that converts and renders for audible output second voice data received from the second communication device, the second voice data being associated with the second conversant. The communication device further comprises a body state maintenance mechanism that uses the first or a second kinesiologically-based model to convert and render for visual output a body state measurement associated with the second conversant. The first kinesiological data is associated with computer game play.

In still yet another aspect, a communication device comprises a voice decoding mechanism that converts and renders for audible output voice data received from a second communication device, the voice data being associated with a conversant operating the second communication device, a speaker kinesiological modeling data structure that provides a first kinesiologically-based model and a body state maintenance mechanism that uses the first kinesiologically-based model to convert and render for visual output a body state measurement associated with the second conversant. The communication device further comprises a voice encoding mechanism that converts a voice utterance of a second conversant into second voice data, the second voice data being for receipt and rendering for audible output by the second communication device, the second conversant operating the communication device. The communication device further comprises a body state and data encoding mechanism that uses the first or a second kinesiologically-based model to convert a body state measurement associated with the second conversant into second kinesiological data, the second kinesiological data being for receipt and rendering for visual output by the second communication device. The body state measurement associated with the second conversant is associated with computer game play.

DETAILED DESCRIPTION

A communication system supplements the voice channel with information related to each conversant's body configuration and movement and gestures. Each conversant is generally referred to herein as a speaker when generating speech during a conversation. Alternatively, the conversant need not convey speech during a conversation, as when one conversant is listening to another conversant speaking. The communication network is either a conventional public switched telephone network, a cellular telephone network, the internet, any other conventional data network, or a combination thereof. Alternatively, the communication network is any appropriate network capable of transporting a data signal. In general, the communication system enables two or more conversants to communicate with each other over a communication network. For illustrative purposes, the communication system is described herein in relation to two conversants.

A sending conversant uses a sending communication device to transmit voice and body configuration and movement information over a communication network to a receiving communication device used by a receiving conversant. The sending device includes means for sensing the body configuration and movement of the sending conversant, collected as body state measurements. The sending communication device also includes means for detecting speech uttered by the sending conversant, such as an audio microphone. The detected speech and body state measurements are encoded and multiplexed into a communication signal which is transmitted to the receiving device.

Each communication device includes a speaker kinesiological model. The speaker kinesiological model is a computational model representing a body structure framework, which provides a parameterized model of aspects of the speaker's physiognomy, posture, and pose. In other words, the speaker kinesiological model provides specifications regarding the body configuration of a speaker, such as size, mass, body limb dimensions, and the like. This model is used as a framework to which the body state measurements are applied, thereby generating a current body state model of the speaker's body position. This current body state model represents the current position of the speaker's body taking into account movement from the framework position represented by the kinesiological model. One type of speaker kinesiological model includes a general speaker kinesiological model. The general kinesiological model represents a generalized body structure based on information derived from the general human population. Alternatively, other generalized body structures are used. Another type of speaker kinesiological model is a speaker-specific kinesiological model. Such a speaker-specific kinesiological model is generated using a general kinesiological model and also body measurements related to a specific speaker. The type of speaker kinesiological model used is selected, and the particular aspects of the speaker kinesiological model are composed, by the designer and/or user of the communication device.

The speaker kinesiological model is multiplexed along with the encoded speech and body state measurements for transmission to the receiving device. Upon receiving the communication signal from the sending device, the receiving device de-multiplexes and decodes the communication signal. The decoded speech is sent to a means for presenting an audio signal to the receiving conversant, such as a speaker. The speaker kinesiological model and the body state measurements are used to generate a body state model which represents the current position state of the sending conversant's body. The body state model is then rendered to the receiving conversant, such as by sending a video signal to a visual display.

Figure 1:
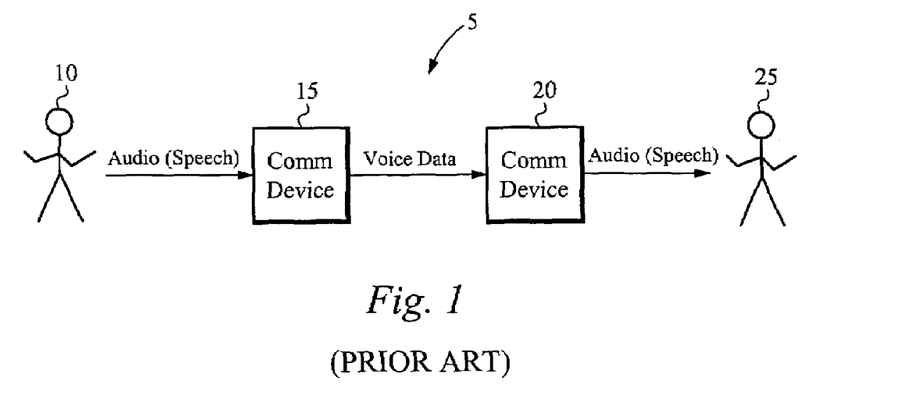
FIG. 1 illustrates a conventional voice communication system.

FIG. 1 illustrates a conventional voice communication system 5. The voice communication system 5 includes a first conversant 10, a first communication device 15, a second communication device 20, and a second conversant 25. The first communication device 15 and the second communication device 20 exchange voice data over a voice communications network. In an exemplary case, the communication devices 15 and 20 are cellular telephones, which communicate with each other over a cellular telephone network. In the communication system 5, the first conversant speaks into the first communication device 15. The first communication device 15 converts and encodes the received speech into voice data appropriately formatted for transmission over the voice communication network. The voice data is received by the second communication device 20. The second communication device 20 decodes and converts the voice data into an audio signal, which is provided to the second conversant 25.

Figure 2:
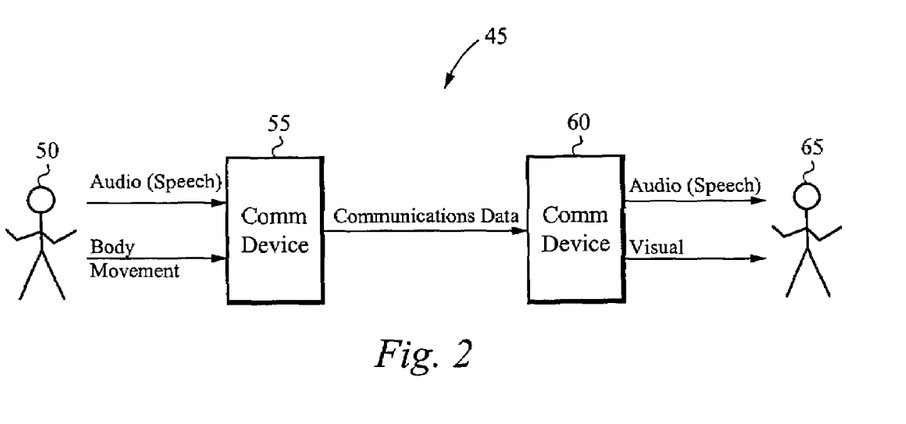
FIG. 2 illustrates an overview of a communication system that provides voice data and body state data from a first conversant to a second conversant.

FIG. 2 illustrates an overview of a communication system 45 that provides voice data and body configuration and movement data from a first conversant 50 to a second conversant 65. The communication system 45 includes a first communication device 55 and a second communication device 60 coupled via a conventional communications network. The first communication device 55 receives speech and body configuration and movement signals associated with the first conversant 50. The first communication device 55 converts and encodes the received speech into voice data appropriately formatted for transmission over the communications network. The first communication device 55 also converts and encodes the received body configuration and movement signals into body configuration and movement data appropriately formatted for transmission over the communication network. The voice data and the body configuration and movement data are multiplexed by a data multiplexer within the first communication device 55, and the multiplexed data is transmitted over the communication network. Alternatively, the data multiplexor is separate from the first communication device 55. Still alternatively, the voice data and the body configuration and movement data are not multiplexed, and are instead transmitted independently over the communication network.

The second communication device 60 receives the multiplexed data and de-multiplexes the data into the voice data and the body configuration and movement data using a data de-multiplexer within the second communication device 60. Alternatively, the data de-multiplexer is separate from the second communication device 60. Still alternatively, the voice data and the body configuration and movement data are received by the second communication device 60 as separately transmitted data. The second communication device 60 decodes and converts the voice data into an audio signal. The second communication device 60 also decodes and converts the body configuration and movement data into a video signal. The audio signal and the video signal are appropriately synchronized and presented to the second conversant 65.

Figure 3:
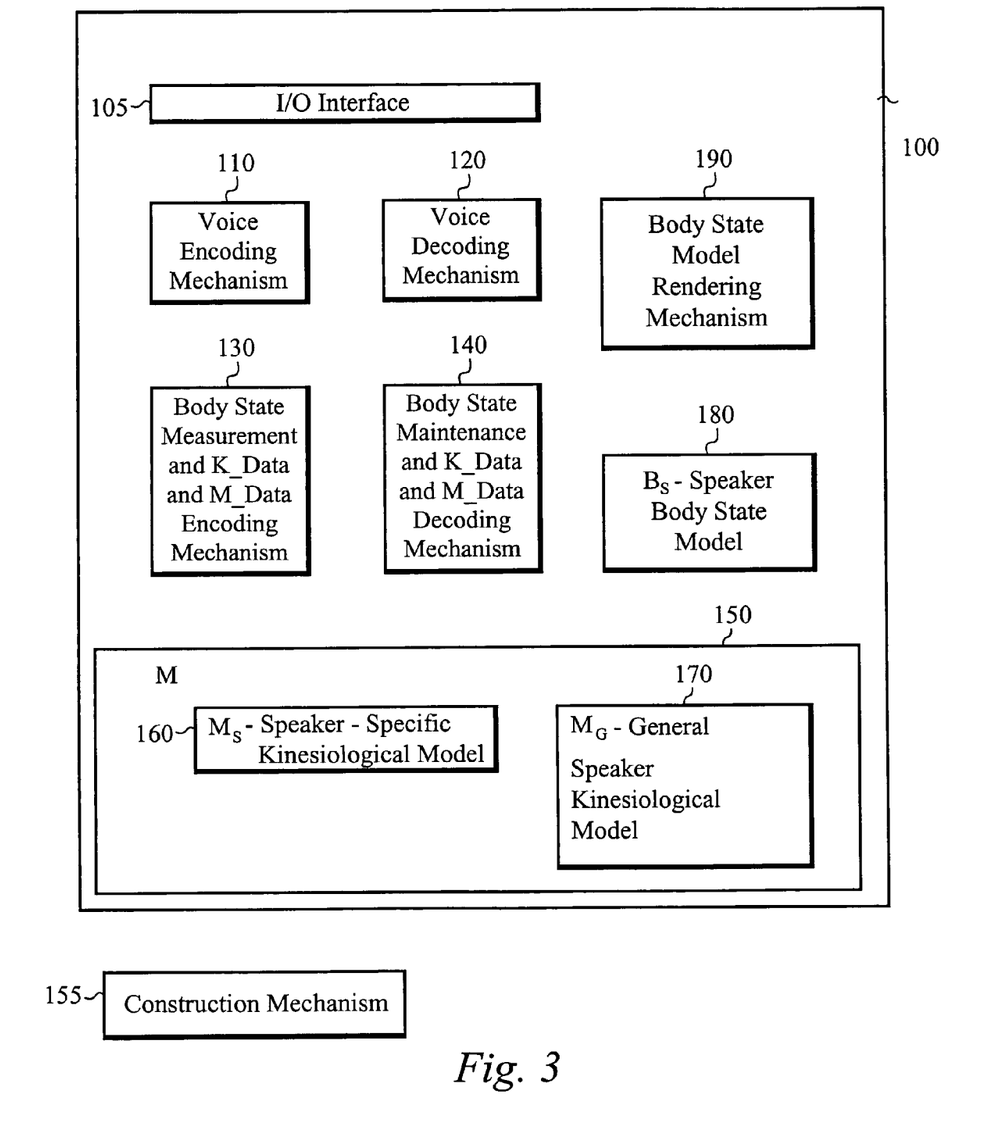
FIG. 3 illustrates a communication device of the communication system of FIG. 2.

FIG. 3 illustrates a communication device 100 which provides the functionality described above in relation to the first and second communication devices 55 and 60, respectively, of FIG. 2. The communication device 100 includes an input/output (I/O) interface 105, a voice encoding mechanism 110, a voice decoding mechanism 120, a body state measurement and kinesiological data (herein referred to as "K_Data") and model data (herein referred to as "M_Data") encoding mechanism 130, a body state maintenance and K_Data and M_Data decoding mechanism 140, a speaker kinesiological modeling data structure 150, a speaker body state model 180, and a body state model rendering mechanism 190. The speaker kinesiological modeling data structure 150 in general embodies a speaker kinesiological model M. The speaker kinesiological model M is composed of or includes a general speaker kinesiological model $M_G$ 170 or is composed of or includes a speaker-specific kinesiological model $M_S$ 160. The general speaker kinesiological model $M_G$ 170 is also referred to as general model $M_G$, and the speaker-specific kinesiological model $M_S$ 160 is also referred to as speaker-specific model $M_S$. The general speaker kinesiological model $M_G$ 170 is a general model and is supplied to the communication device 100 at the time of manufacture. Alternatively, the general speaker kinesiological model $M_G$ 170 is supplied during a communication device 100 configuration upload. The general speaker kinesiological model $M_G$ 170 is selected from a library of available general speaker kinesiological models.

The speaker-specific kinesiological model $M_S$ 160 builds on the general speaker kinesiological model $M_G$ 170. The user of communication device 100 provides input that is used to customize the general speaker model $M_G$ 170 to form the speaker-specific model $M_S$ 160. Such user input is input directly into the communication device 100 or is input into another device, such as a personal computer using a model construction mechanism 155. The model construction mechanism 155 is used by a manufacturer and/or designer to select and/or construct the appropriate model. Alternatively, the model construction mechanism 155 is used by the user 100 to select and/or construct the appropriate model either on the communication device 100 or from another device, such as a personal computer, from which the model is then loaded onto the communication device 100.

The I/O interface 105 is generally any means for providing input from the communication device user to the communication device 100, or any means for providing output to the communication device user from the communication device 100. Such input/output means include, but are not limited to, an audio microphone, an audio speaker, a keyboard, and a visual display. Other input means also include sensors for directly measuring body configuration and movements of the communication device user, or for receiving body configuration and movement data detected by sensors located externally to the communication device.

The communication device 100 is either a conventional telephone, a cellular telephone headset, a computer, a personal digital assistant (PDA), or an internet gaming device (e.g., coupled to another gaming device via the Internet). Alternatively, the communication device 100 is any communicating device capable of transmitting and receiving data.

Figure 4:
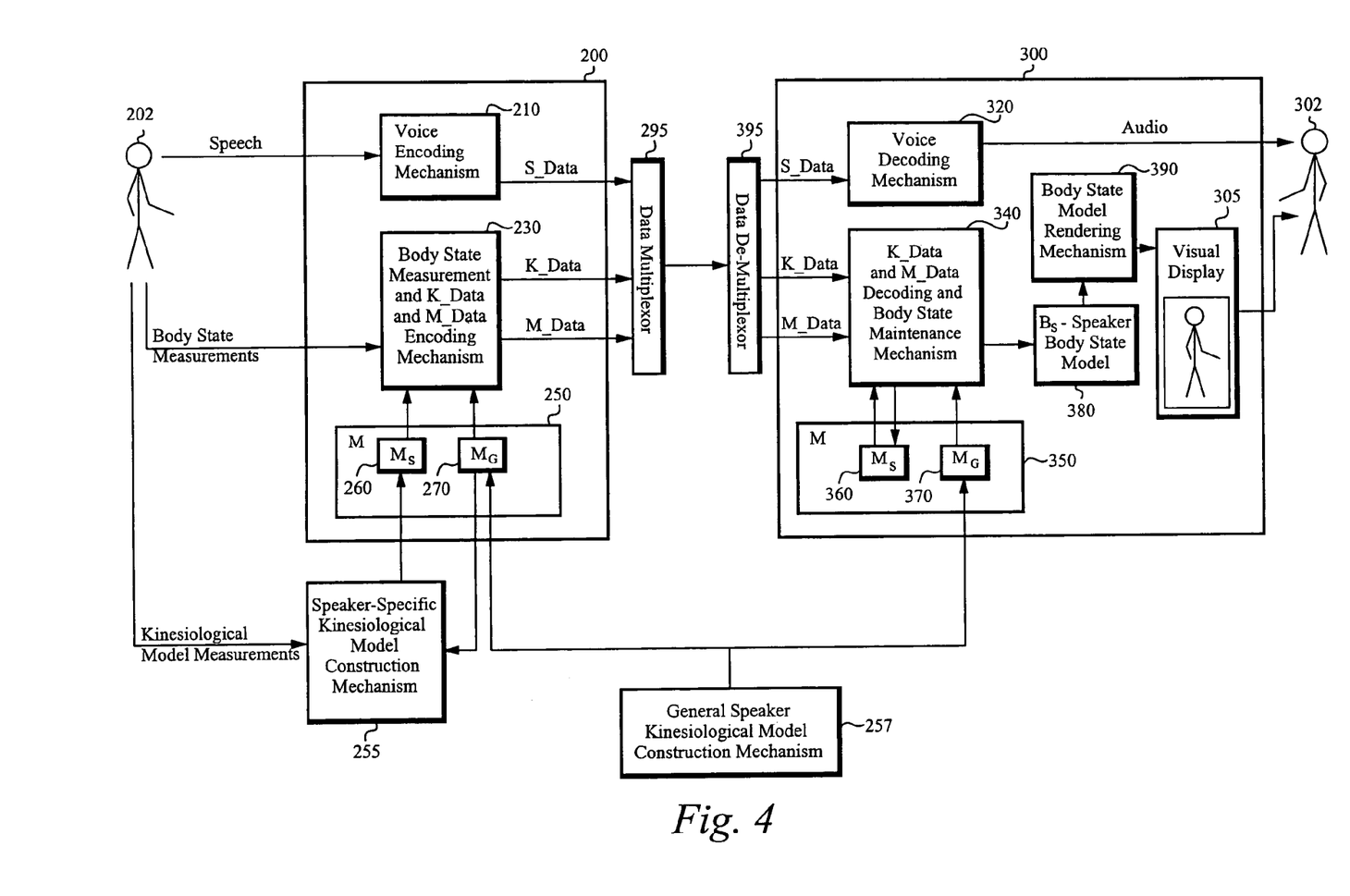
FIG. 4 illustrates an embodiment of the communication system of FIG. 2.

Operation of the communication device 100 is described in relation to FIG. 4. FIG. 4 includes two communication devices, a sending device 200 and a receiving device 300, of the type described above in relation to the communication device 100 of FIG. 3. For simplicity, the sending device 200 in FIG. 4 illustrates only the components of the communication device 100 (FIG. 3) related to sending a voice and body configuration and movement communication. Similarly, the receiving device 300 in FIG. 4 illustrates only the components of the communication device 100 (FIG. 3) related to receiving the voice and body configuration and movement communication. It is understood that the sending device 200 and the receiving device 300 each include all the same components of the communication device 100 (FIG. 3), including an I/O interface (not shown in FIG. 4). As such, both the sending device 200 and the receiving device 300 are capable of sending and receiving a voice and body configuration and movement communication.

The sending device 200 includes a voice encoding mechanism 210, a body state measurement and K_Data and M_Data encoding mechanism 230, a speaker kinesiological modeling data structure 250, which includes a speaker-specific kinesiological model $M_S$ 260 and/or a general speaker kinesiological model $M_G$ 270. The sending device 200 is preferably coupled to an external speaker-specific kinesiological model construction mechanism 255. In the case where the sending device 200 utilizes a speaker-specific kinesiological model, then the speaker-specific kinesiological model construction mechanism 255 generates the speaker-specific kinesiological model $M_S$ 260 according to the input previously provided by the user to the speaker-specific kinesiological model construction mechanism 255, as described above. The receiving device 300 includes a voice decoding mechanism 320, a K_Data and M_Data decoding and body state maintenance mechanism 340, a body state model rendering mechanism 390, a speaker body state model $B_S$ 380, and a speaker kinesiological modeling data structure 350, which includes a speaker-specific kinesiological model $M_S$ 360 and/or a general speaker kinesiological model $M_G$ 370.

During a communication between the sending device 200 and the receiving device 300, any speech made by a conversant is converted to data, referred to as S_Data. Concurrently, body state measurements are made of the positions of a number of each conversant's body parts. The body state measurements are converted to data, referred to as K_Data. K_Data and S_Data are synchronized relative to each other, referred to as temporal synchronization.

Body state measurements associated with a particular conversant are obtained by measuring movement of the communication device used by the particular conversant. Examples of such body state measurements include orientation of the communication device, acceleration of the communication device, tactile pressure sensed by the communication device, explicit use of a keyboard included with the communication device, and/or position and/or orientation of the communication device relative to the conversant or any other object. Specifically, the orientation of the communication device is measured with respect to a local gravitational field, such as using a tilt sensor, or with respect to the Earth's magnetic field, such as using a flux gate electronic compass. Alternatively, any other method of measuring the communication device's orientation is used. The acceleration of the communication device is measured linearly, such as by using microelectromechanical system (MEMS) accelerometer groupings, or angularly, such as using MEMS rate gyro groupings. Alternatively, any other method of measuring the communication device's acceleration is used. Tactile pressure is measured on one or more areas of the communication device surface that is sensitive to pressure, such as areas on the sides of the communication device used to hold the communication device during normal spoken conversation. Alternatively, any other method of measuring tactile pressure is used. Position and/or orientation of the communication device is measured relative to the conversant and/or objects in the area around the conversant. Such measurements are derived by analysis of apparent scene motion and/or conversant motion within a visual field of an image sensing system mechanism on the conversant's communication device. Alternatively, any other method of measuring the position and/or orientation of the communication device relative to the conversant or another object is used.

In an alternative embodiment, the body state measurements associated with a particular conversant are obtained by explicitly measuring the movement of one or more body parts of the conversant. For example, a limb position relative to the communication device, or relative to one or more other similarly instrumented conversant body parts, using conventional magnetic field location and orientation sensors. These sensors are included within small device components worn by the conversant at one or more limb positions, or other strategically located positions on the conversant's body. Sensors are also incorporated into an ear-mounted speaker/microphone, watch, belt, bracelet or other jewelry, shoe or shoe ornament, or the like. Such sensors communicate their measurements to the communication device by means of a short range, low power, radio frequency data transmission mechanism. Alternatively, any other conventional method of communicating sensor measurements to the communicating device is used.

It is understood that any conventional method of measuring the movement of one or more portions of the conversant's body is used to obtain the body state measurements. It is also understood that body state measurements can be obtained using any combination of the aforementioned methods.

At each recipient's end, the K_Data received from each conversant is decoded and used by a body state maintenance mechanism to keep a body state model data structure $B_S$ in synchronization with the incoming K_Data. A kinesiologically-based computational model M is generated for each speaker. The kinesiologically-based computational model M provides a framework describing the physical characteristics of the corresponding conversant. Examples of information included within the model M include, but are not limited to, body part identification, size, mass and connectivity, joint rotation directional and angular limitations, and methods to estimate body part state indirectly from measurements from other body parts, for example elbow position from hand position and/or orientation. Such methods included within model M are dynamic in that they involve the solution of a differential equation-based mechanical model of body structure. It is understood that any information related to body specifications, positions, methods of direct and indirect measurements, and any other information related to the conversant's body are included in the model M.

The model M is either of a general nature, referred to as a general speaker kinesiological model $M_G$, or of a speaker-specific nature, referred to as a speaker-specific kinesiological model $M_S$. The general model $M_G$ is constructed by designers of the communication device 200 and/or the communication device 300 based on information derived from the general human population. The general model $M_G$ is loaded into the communication device memory at the time of manufacture or is transmitted to the communication device during configuration uploads. The speaker-specific model $M_S$ is generated by a speaker-specific kinesiological model construction mechanism which builds upon the general model $M_G$ by adding relevant speaker-specific measurements of body structure, referred to as kinesiological model measurements, to the general model $M_G$. An example of kinesiological model measurements include explicit manual measurement of relevant parameters, such as height, weight, girth at designated locations, and limb length. Another example of kinesiological model measurements includes acquisition of an image or images of the conversant, where each image is acquired with known or designated position and orientation relative to the conversant. Locations on the image(s) key to the kinesiological model are manually identified on the image(s). Alternatively, identification of these key locations is performed automatically. Still alternatively, identification of the key locations is performed automatically with manual verification and correction.

The speaker kinesiological model M (M_Data) is transmitted by the sending device 200 to the receiving device 300 at the beginning of the communication. In this manner, the receiving device 300 uses its body state maintenance mechanism along with the transmitted speaker kinesiological model M to produce an initial speaker body state model $B_S$.

During the communication between the sending device 200 and the receiving device 300, the body state maintenance mechanism uses the model M for each respective conversant to govern the manner in which the incoming K_Data is reflected in changes made to that conversant's $B_S$ data structure. Based on the received K_Data, the receiving device 300 maintains the computational model of the sending conversant's current body position, model $B_S$, and renders the conversant's current body position in a visual manner to the recipient conversant. An input/output interface of the communication device 200 includes a display in which the sending conversant's current body position is visually rendered to the recipient conversant. Alternatively, a display device external to the communication device 300 is coupled to receive a video signal from the communication device 300. The video signal is then displayed on the display device 300. Still alternatively, the conversant's current body position is rendered in a non-visual manner to the recipient conversant.

K_Data is also transmitted even when the voice channel is transmitting silence, for example when a conversant is listening to another's speech and is implicitly responding with visual gestures and cues. Feedback is also provided to the speaker at the sending device 200 by maintaining the same model $B_S$ within the sending device and locally rendering the sending conversant's current body position to the speaker (not shown explicitly in FIG. 4).

An exemplary communication between a sending conversant 202 and a receiving conversant 302, each using a communications device 200 and 300, respectively, is now described in relation to FIG. 4. Prior to the communication, the conversants' respective devices negotiate, for each sending-receiving device pair, the most effective type of model M that is capable of being used by both the sending and receiving devices; that is, either the general model $M_G$, a version of which is located on both devices, or the speaker-specific model $M_S$ originally resident on the sending device 200. The general models $M_G$ 270 and $M_G$ 370 are previously loaded from an external general speaker kinesiological model construction mechanism 257. The speaker-specific model $M_S$ 260 is previously loaded from an external speaker-specific kinesiological construction mechanism 255.

Once the type of model M is determined, this model type M is used for the entirety of the communication. Alternatively, the type of model M is dynamically changed during the course of the communication by agreement between the sending and receiving devices 200, 300. Within the sending device 200, the speaker kinesiological modeling data structure 250 provides the type of model M selected by the above negotiation process.

If it has been determined to use the general model $M_G$ 270 (and $M_G$ 370), then at the sending device 200 the speaker kinesiological modeling data structure 250 provides the previously loaded general model $M_G$ 270 to the body state measurement and K_Data and M_Data encoding mechanism 230. Similarly, at the receiving device 300 the speaker kinesiological modeling data structure 350 provides the previously loaded general model $M_G$ 370 to the K_Data and M_Data decoding and body state maintenance mechanism 340.

If it has been determined to use the speaker-specific model $M_S$ 260, then the speaker kinesiological modeling data structure 250 provides the speaker-specific model $M_S$ 260, to the body state measurement and K_Data and M_Data encoding mechanism 230.

The body state measurement and K_Data and M_Data encoding mechanism 230 converts and formats the model M provided by the speaker kinesiological modeling data structure 250 for transmission to the receiving device 300 as M_Data. The M_Data is transmitted to the K_Data and M_Data decoding and body state maintenance mechanism 340 of the receiving device 300 at the beginning of the communication. Where the selected model M is the speaker-specific model $M_S$, the M_Data sent to the receiving device 300 includes the model $M_S$. Where the selected model M is the general model $M_G$, the M_Data includes an indication that the receiving device 300 is to use it's version of the general model $M_G$ (general model $M_G$ 370), where the general model $M_G$ 370 was previously loaded from the external general speaker kinesiological model construction mechanism 257. Alternatively, where the selected model M is the general model $M_G$, the M_Data includes a converted and formatted version of the general model $M_G$ 270 stored in the sending device 200. In this manner, if the sending device 200 includes a different version of the general model $M_G$ than does the receiving device 300, then the proper version is used.

In the case where the transmitted M_Data includes an explicit model (sender's $M_S$ or sender's $M_G$) from the sending device, the receiving device's K_Data and M_Data decoding and body state maintenance mechanism 340 will store this model in the receiving device's speaker kinesiological modeling data structure 350 for the duration of the conversation. Alternatively, models may be cached in a receiving device for use in future conversations with the same sending device.

During the communication, the sending conversant 202 either speaks, moves their body, or both. Speech generated by the sending conversant 202 is received by the I/O interface of communication device 200 (not shown), for example a microphone. The received speech is then encoded into S_Data using the voice encoding mechanism 210. Body configuration and movement of the sending conversant 202 is detected and measured, and data representing body state measurements are sent to the body state measurement and K_Data and M_Data encoding mechanism 230. The received body state measurements are encoded by the body state measurement and K_Data and M_Data encoding mechanism 230 into K_Data. This encoding is performed with respect to the particular structure of the speaker kinesiological model M 250 determined for this conversation. The K-Data and the S_Data are temporally synchronized and sent to a data multiplexer 295. The data multiplexer is external to the sending device 200. Alternatively, the data multiplexer is integrated within the sending device 200. K_Data and S_Data are also multiplexed with M_Data.

The multiplexed signal is transmitted over a communication network to a data de-multiplexer 395. The data de-multiplexer is external to the receiving device 300. Alternatively, the data de-multiplexer is integrated within the receiving device 300. The received multiplexed signal is de-multiplexed by the data de-multiplexer 395 into the K_Data signal and the S_Data signal, along with the M_Data signal when appropriate. The S_Data is sent to the voice decoding mechanism 320, where the S_Data is decoded into an audio signal. The audio signal is then rendered to the receiving conversant 302 via an I/O interface of communication device 300 (not shown), such as an audio transducer.

The M_Data is sent to the speaker kinesiological modeling data structure 350 via the K_Data and M_Data decoding and body state maintenance mechanism 340. The speaker kinesiological modeling data structure 350 uses the M_Data to generate either a general model $M_G$ according to the model $M_G$ 370 previously loaded into memory of the communication device 300, or a speaker-specific model $M_S$ 360. Determination of which model M to generate is dependent on the M_Data received from the sending device 200. If the received M_Data includes speaker-specific information, then the M_Data is used to generate a receiving device-resident, speaker-specific model $M_S$ 360, which is an effective copy of the sending device's speaker-specific model $M_S$ 260, upon which the M_Data was based. If the M_Data includes an indication that a general speaker kinesiological model is to be used, then the speaker kinesiological modeling data structure 350 retrieves the previously loaded general model $M_G$ 370. Alternatively, the M_Data includes the converted and formatted version of the general model $M_G$ 270 stored in the sending device 200, which is used in place of the general model $M_G$ 370. The appropriate kinesiological model M is then sent to be used or accessed at the K_Data and M_Data decoding and body state maintenance mechanism 340.

During the conversation, K_Data is sent to the K_Data and M_Data decoding and body state maintenance mechanism 340. Within the K_Data and M_Data decoding and body state maintenance mechanism 340, the K_Data is decoded to obtain the body state measurements corresponding to the sending conversant 202. Then, the K_Data and M_Data decoding and body state maintenance mechanism 340 uses the kinesiological model M received from the speaker kinesiological modeling data structure 350 and the decoded body state measurements to update a speaker body state model $B_S$ 380. The body state model $B_S$ 380 is a computational model representing the current body position of the sending conversant 202. The body state model $B_S$ 380 is accessed by the body state model rendering mechanism 390 where the computational model is converted into a video signal suitable for display on the visual display 305. As previously noted, presentation of the video signal on the visual display 305 is temporally synchronized with the audio signal presented to the receiving conversant 302 from the voice decoding mechanism 320. In this manner, the receiving conversant 302 hears speech generated by the sending conversant 302 while simultaneously viewing body configuration and movement made by the sending conversant 202 at the time the speech is uttered.

In an alternative embodiment, the visual display 305 is a visual display device external to the communication device 300. In this alternative case, the external visual display device is coupled to the I/O interface (not shown in FIG. 4) of the communication device 300 and receives the video signal generated by the body state model rendering mechanism 390.

Figure 5:
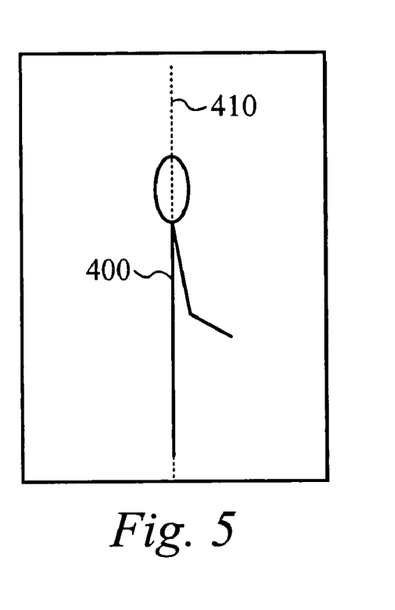
FIG. 5 illustrates a graphical representation of an exemplary body state model consisting of a speaker kinesiological model.

FIG. 5 illustrates a visual representation of an exemplary body state model $B_S$ including a speaker kinesiological model M. A stick-figure 400 represents a speaker kinesiological model M, which in this case is represented by a general speaker kinesiological model $M_G$. The general model $M_G$ illustrated in FIG. 5 represents a simple, planar, two-jointed model. The two joints, in this case, are located at the waist 420 (FIG. 6) and the neck 430 (FIG. 6) of the stick FIG. 400. Other simple models (e.g., front) may be used. The general model $M_G$ is augmented with an image of the conversant's head or face to form a speaker-specific model $M_S$. The visual representation of the body state mode $B_S$ is rendered in a front, side, or perspective view and is "fleshed out" from the stick FIG. 400 to a more realistic human form. The body state model $B_S$ represents a conversant's current body position. The current body position is determined by applying body state measurements obtained by the sending device to the speaker kinesiological model M. FIG. 5 represents the body state model $B_S$ of the sending conversant before any body state measurements are made. As such, the body state model $B_S$ shown in FIG. 5 conforms to the speaker kinesiological model M, which in this case is general model $M_G$. As a framework, the general model $M_G$, visually represented as stick FIG. 400, is aligned along axis 410 in FIG. 5.

Figure 6:
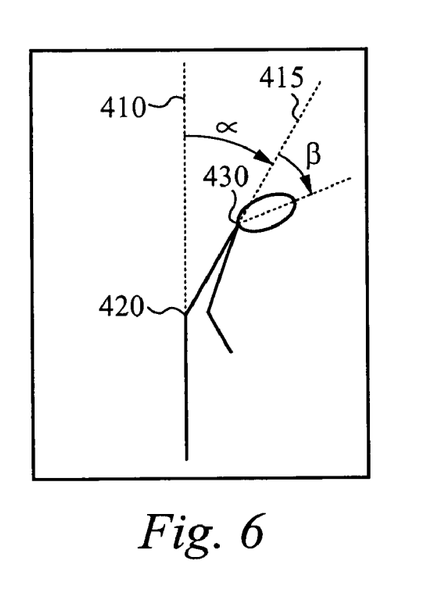
FIG. 6 illustrates a graphical representation of the body state model of FIG. 5 including body state measurements.

FIG. 6 illustrates a visual representation of the body state model $B_S$ of FIG. 5 after body state measurements are applied. In an exemplary communication device, a single-axis gravimetric tilt sensor ST (not shown), and a hand pressure squeeze sensor SP (not shown), are included. The angle $\alpha$ of the associated body state model $B_S$ is controlled by the tilt sensor ST. The angle $\alpha$ corresponds to movement at the waist 420 from axis 410 of the stick FIG. 400. In this case, angle $\alpha$ equals zero degrees corresponds to the output of the tilt sensor ST when the sending conversant 202 is in a neutral posture. A typical estimate of neutral posture is made by computing a short term average of the sending device's ST values at the beginning of the conversation.

The angle $\beta$ of the associated body state model $B_S$ is controlled by the pressure sensor SP. The angle $\beta$ corresponds to movement at the neck 430 from an axis 415 of the stick FIG. 400. In this case, angle $\beta$ equals zero degrees corresponds to the output of the hand pressure squeeze sensor SP when there is zero pressure. A locally maintained and rendered sending conversant's 202 body state model $B_S$ (as mentioned above) provides the sending conversant 202 with feedback as to how her current posture will be viewed and interpreted by the receiving conversant 302.

Figure 7:
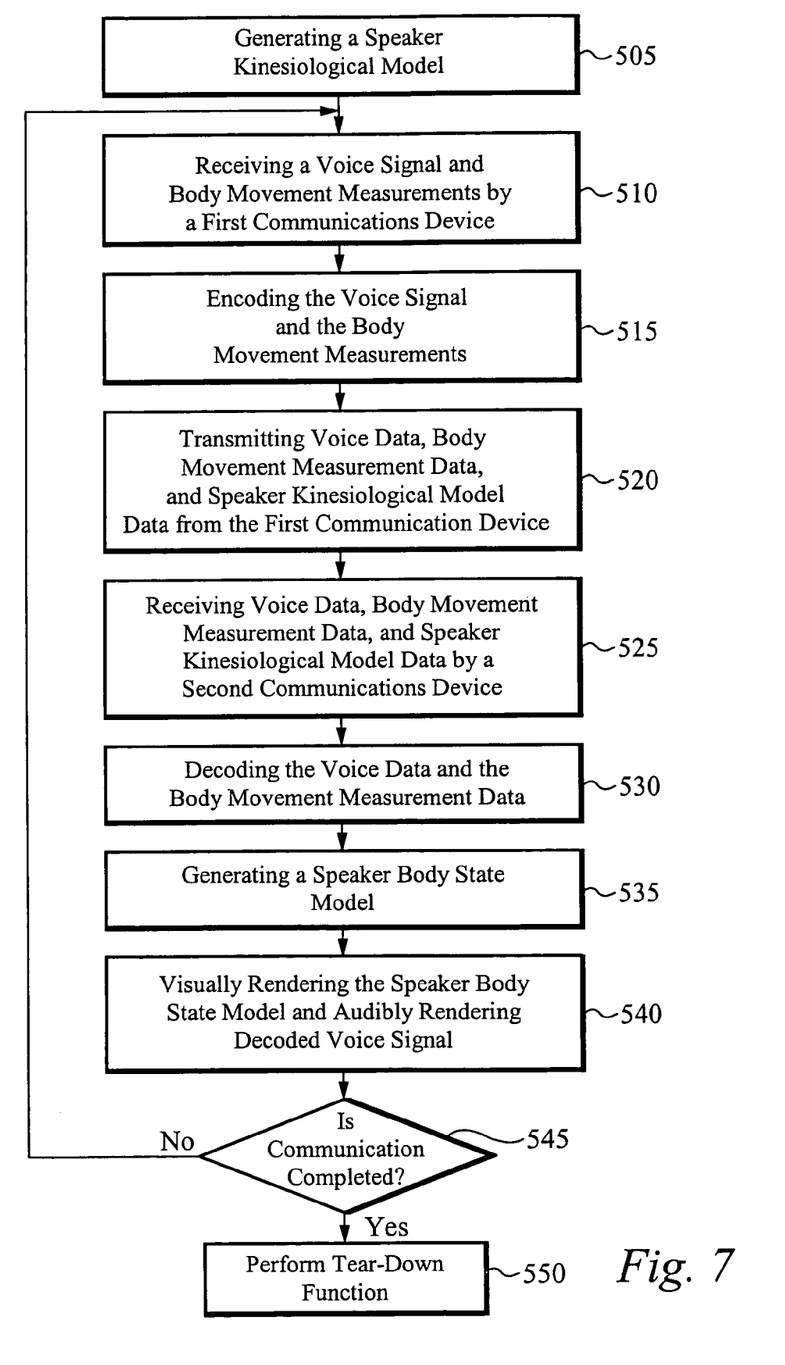
FIG. 7 illustrates a method of communicating both speech and body state of a conversant to another conversant over a communication network.

FIG. 7 illustrates a first method of communicating both speech and body configuration and movement of a first conversant 202 to a second conversant 302 over a communications network. Description of the first method also references the communication system of FIG. 4. At the step 505, a speaker kinesiological model M is generated. The speaker kinesiological model M is loaded onto a first communication device 200 during an initialization step. At the step 510, the first communications device 200 acquires a voice signal uttered by the first conversant 202. The first communications device 200 also acquires body configuration and movement measurements corresponding to the first conversant 202. At the step 515, the voice signal and the body configuration and movement measurements are encoded to form voice data and body configuration and movement measurement data. The voice data and the body configuration and movement measurement data are formatted for transmission over a communications network. The speaker kinesiological model M is also formatted for transmission over the communications network. At the step 520, the voice data, the body configuration and movement measurement data and the speaker kinesiological model M are transmitted by the first communications device 200 over the communications network. At the step 525, a second communications device 300 receives the transmitted voice data, body configuration and movement measurement data, and the speaker kinesiological data M. At the step 530, the voice data and the body configuration and movement measurement data are decoded. At the step 535, a speaker body state model $B_S$ is generated and its state is initialized according to the decoded body configuration and movement measurement data and the speaker kinesiological model. At the step 540, the speaker body state model $B_S$ is visually rendered by the second communications device 300, and the decoded voice data is audibly rendered by the second communications device 300.

At the step 545, it is determined if the communication between the first conversant 202 and the second conversant 302 is completed. If it is determined at the step 545 that the communication is not completed, then the method returns to the step 510. Steps 510 through 540 are repeated until it is determined at the step 545 that the communication is completed. Once it is determined at the step 545 that the communication is completed, then at the step 550 a tear down function is performed. The tear down function discontinues a communication channel between the first communication device 200 and the second communication device 300. The tear down function also clears the visual display of any data associated with the communication, including the visual rendering of the speaker body state model.

An exemplary use for the communication system described above is for a video game application. In such an application, the first conversant 202 is a first video game player, and the first communication device 200 is a first video game system. Similarly, the second conversant 302 is a second video game player, and the second communication device 300 is a second video game system. The first video game system receives body configuration and movement measurements corresponding to the first video game player and transmits these received body configuration and movement measurements to the second video game system, which is a device capable of rendering a speaker body state model corresponding to the received body configuration and movement measurements of the first video game player. The first video game system is also capable of rendering the speaker body state model of the first video game player. Similarly, the second video game system receives body configuration and movement measurements corresponding to the second video game player and transmits these received body configuration and movement measurements to the first video game system, which is capable of rendering a speaker body state model corresponding to the received body configuration and movement measurements of the second video game player. The second video game system is also capable of rendering the speaker body state model of the second video game player. In this manner, the first video game player and the second video game player communicate as a multi-player game. The first video game system and the second video game system are coupled to a communications network, such as the internet. Alternatively, more than two players are coupled together in a multi-player game.

In an alternative embodiment, the first communication device 200 functions as a stand-alone device. In this alternative embodiment, the visual display within the first communication device 200 visually renders the speaker body state model $B_S$ corresponding to the first conversant 202. In this manner, the first conversant 202 sees their own body configuration and movements in the first communication device 200. In an exemplary application of this alternative embodiment, the first communication device 200 is a video game system including a display screen, and the first conversant 202 is a video game player. The video game system runs a video game which is displayed on the display screen. Body configuration and movement of the video game player is measured by the video game system and incorporated into the video game. As the video game player moves, this movement is translated into movement on the display screen of the video game system. The video game system includes a game console and a display device, such as a television or a personal computer. Alternatively, the video game system is a hand held device. It is understood that audio signals corresponding to the video game player are also capable of being received and transmitted by the video game console.

It is understood that other methods of generating and controlling a body state model $B_S$ are also possible. One such method includes the use of music to determine the body state model $B_S$. Rhythmic components of the music are extracted by signal processing from music represented as analog audio or are more directly obtained from symbolically represented music, such as MIDI. The rhythmic musical components then either directly control the receiving device's body state model $B_S$, or modulate a pre-recorded sequence of body state model $B_S$ states, as governed by the speaker kinesiological model M, so as to give the effect of "dancing" to the music. Another method includes extracting rhythmic components from a conversant's speech, as opposed to from music.

Another method of generating and controlling a body state model $B_S$ includes pre-recording body motions or maneuvers. The body motions or maneuvers are pre-recorded as the conversant performs them, or they are entered in some form of symbolic representation. Exemplary body motions include, but are not limited to, hand clapping, jumping up and down, or cartwheels. These recorded motions are associated with cellular telephone keystroke sequences, for example, as in a computer software macro-like manner. The recorded motions are also triggered by other body motions, typically simpler body motions than the originally pre-recorded body motions, thereby causing the receiving device's body state model $B_S$ to follow the recorded motions. Such recorded motions are also contributed to and downloaded from an external shared library maintained by the device manufacturer or other third party.

Such recorded motions are also delivered to receiving devices in situations without a real-time duplex connection between sending and receiving devices by means of cell phone system data delivery methods such as short messaging system (SMS) or by means of the sending conversant's cell phone voice mail system.

It is also possible to associate recorded motions with the request of a sending conversant to initiate a conversation.

The recorded motions (which are resident on or accessible to the receiving device) are rendered as an announcement of the request to converse. Cached speaker-specific models associated with sending device identifiers, such as a calling cell phone number, allow such receiving device renderings to identify the sending conversant to the receiving conversant before the conversation initiation request is accepted. This provides a visual "ringdance" analog to conventional cell phone "ringtones" and "ringtunes."

In yet another method of generating and controlling a body state model $B_S$, no conversant body state measurement mechanism, such as sensors, need be present in the conversant's communication device. Instead, the body state model $B_S$ is derived from explicit commands entered via a conversant's communication device keyboard, and/or the body state model $B_S$ is derived from components extracted from the conversant's speech using signal processing.

It is also understood that it is possible that the speaker kinesiological model M is a composite of multiple speaker-specific kinesiological models $M_S$ provided by multiple conversant's in a multi-party conversation. The composite model M is either manually constructed or automatically constructed from known speaker-specific models $M_S$. It is also understood, that either a single model M or a composite model M is constructed according to a non-human form.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

I claim:

1. A communication device comprising:
   an input/output interface that receives a first voice signal and first body state measurements from a first conversant using the communication device;
   an encoder circuit that converts the first voice signal and the first body state measurements received by the input/output interface into first voice data and first body state data;
   a decoder circuit that converts second voice data and second body state data into a second voice signal and second body state measurements, wherein the second voice data and the second body state data are received by the communication device from a second communication device used by a second conversant; and
   a body state maintenance circuit to generate a body state model according to a baseline computational model and the second body state measurements, wherein the body state model represents a body position of the second conversant,
   wherein the input/output interface audibly provides the second voice signal to the first conversant and visually provides a visual representation of the body state model to the first conversant via a visual display.

2. The communication device of claim 1 wherein the baseline computational model is generated according to baseline computational data received from the second communication device.

3. The communication device of claim 2 wherein the baseline computational model comprises a general speaker baseline computational model indicative of generalized body specifications.

4. The communication device of claim 3 wherein the baseline computational data includes an indicator signifying the general speaker baseline computational model, and upon receiving the indicator, the communication device utilizes a locally stored version of the general speaker baseline computational model.

5. The communication device of claim 4 wherein the general speaker baseline computational model is loaded during manufacturing of the communication device or loaded during a device configuration upload.

6. The communication device of claim 2 wherein the baseline computational model comprises a speaker-specific baseline computational model representative of speaker-specific body specifications corresponding to the second conversant.

7. The communication device of claim 1 wherein the visual representation of the body state model is generated by a visual rendering circuit which accesses the body state model.

8. The communication device of claim 1 further comprising a transceiver circuit to transmit the first voice data and the first body state data, and to receive the second voice data, the second body state data, and baseline computational data corresponding to the second communication device.

9. The communication device of claim 8 wherein the transceiver further comprises a multiplexer to multiplex the first voice data and the first body state data prior to transmission.

10. The communication device of claim 8 wherein the transceiver further comprises a de-multiplexer to de-multiplex a received multiplexed transmission, the multiplexed transmission including the second voice data and the second body state data.

11. The communication device of claim 1 wherein the baseline computational model comprises a general speaker baseline computational model representative of generalized body specifications.

12. The communication device of claim 11 wherein the general speaker baseline computational model is loaded during manufacturing of the communication device or loaded during a device configuration upload.

13. The communication device of claim 1 wherein the baseline computational model comprises an indicator indicating the use of a general speaker baseline computational model such that the second communication device, upon receiving the indicator, utilizes a locally stored version of the general speaker baseline computational model.

14. The communication device of claim 1 wherein the baseline computational model comprises a speaker-specific baseline computational model representative of speaker-specific body specifications corresponding to the second conversant.

15. The communication device of claim 14 wherein the speaker-specific baseline computational model adds kinesiological model measurements to a general speaker baseline computational model representative of generalized body specifications.

16. The communication device of claim 1 wherein the baseline computational model is transmitted from the second communication device to the first communication device at the start of a communication between the first conversant and the second conversant.

17. The communication device of claim 1 further comprising one or more sensors to measure the first body state measurements.

18. The communication device of claim 17 wherein at least one sensor is selected from the group consisting of a tilt sensor, a flux gate electronic compass, a microelectromechanical system accelerometer, a microelectromechanical system rate gyro grouping, and a tactile pressure sensor.

19. The communication device of claim 18 wherein the input/output interface further comprises a means for receiving body state measurement signals from one or more external sensors.

20. The communication device of claim 1 wherein the first body state measurements are entered by the first conversant using a keyboard.

21. The communication device of claim 1 wherein the communication device comprises a video game system.

22. The communication device of claim 21 wherein the video game system comprises a video game console coupled to a display device.

23. The communication device of claim 21 wherein the video game system comprises a handheld device.

24. A network of devices to communicate speech and body states of a conversant, the network of devices comprising:
   a communication network; and
   one or more communication devices coupled together via the communication network, wherein each communication device comprises:
      an input/output interface that receives first voice signal and first body state measurements from a first conversant using the communication device;
      an encoder circuit that converts the first voice signal and the first body state measurements received by the input/output interface into first voice data and first body state data;
      a decoder circuit that converts second voice data and second body state data into a second voice signal and second body state measurements, wherein the second voice data and the second body state data are received by the communication device from a second communication device used by a second conversant; and
      a body state maintenance circuit to generate a body state model according to a baseline computational model and the second body state measurements, wherein the body state model represents a body position of the second conversant,
      wherein the input/output interface audibly provides the second voice signal to the first conversant and visually provides a visual representation of the body state model to the first conversant via a visual display.

25. The network of devices of claim 24 wherein the baseline computational model is generated according to baseline computational data received from the second communication device.

26. The network of devices of claim 25 wherein the baseline computational model comprises a general speaker baseline computational model indicative of generalized body specifications.

27. The network of devices of claim 26 wherein the baseline computational data includes an indicator signifying the general speaker baseline computational model, and upon receiving the indicator, the communication device utilizes a locally stored version of the general speaker baseline computational model.

28. The network of devices of claim 27 wherein the general speaker baseline computational model is loaded during manufacturing of the communication device or loaded during a device configuration upload.

29. The network of devices of claim 25 wherein the baseline computational model comprises a speaker-specific baseline computational model representative of speaker-specific body specifications corresponding to the second conversant.

30. The network of devices of claim 24 wherein the visual representation of the body state model is generated by a visual rendering circuit which accesses the body state model.

31. The network of devices of claim 24 wherein each communication device further comprises a transceiver circuit to transmit the first voice data and the first body state data, and to receive the second voice data, the second body state data, and a baseline computational data corresponding to the second communication device.

32. The network of devices of claim 31 wherein the transceiver further comprises a multiplexer to multiplex the first voice data and the first body state data prior to transmission.

33. The network of devices of claim 31 wherein the transceiver further comprises a de-multiplexer to de-multiplex a received multiplexed transmission, the multiplexed transmission including the second voice data and the second body state data.

34. The network of devices of claim 24 wherein the baseline computational model comprises a general speaker baseline computational model representative of generalized body specifications.

35. The network of devices of claim 34 wherein the general speaker baseline computational model is loaded during manufacturing of the communication device or loaded during a device configuration upload.

36. The network of devices of claim 24 wherein the baseline computational model comprises an indicator indicating the use of a general speaker baseline computational model such that the second communication device, upon receiving the indicator, utilizes a locally stored version of the general speaker baseline computational model.

37. The network of devices of claim 24 wherein the baseline computational model comprises a speaker-specific baseline computational model representative of speaker-specific body specifications corresponding to the second conversant.

38. The communication device of claim 37 wherein the speaker-specific baseline computational model adds kinesiological model measurements to a general speaker baseline computational model representative of generalized body specifications.

39. The network of devices of claim 24 wherein the baseline computational model is transmitted from the second communication device to the first communication device at the start of a communication between the first conversant and the second conversant.

40. The network of devices of claim 24 wherein each communication device further comprises one or more sensors to measure the first body state measurements.

41. The network of devices of claim 40 wherein at least one sensor is selected from the group consisting of a tilt sensor, a flux gate electronic compass, a microelectromechanical system accelerometer, a microelectromechanical system rate gyro grouping, and a tactile pressure sensor.

42. The network of devices of claim 41 wherein the input/output interface further comprises a means for receiving body state measurement signals from one or more external sensors.

43. The network of devices of claim 24 wherein the first body state measurements are entered by the first conversant using a keyboard.

44. The network of devices of claim 24 wherein the communication device comprises a video game system.

45. The network of devices of claim 44 wherein the video game system comprises a video game console coupled to a display device.

46. The network of devices of claim 44 wherein the video game system comprises a handheld device.

47. A method of communicating speech and body states of a first conversant to a second conversant over a communications network, the method comprising:
   receiving a first voice signal and first body state measurements from the first conversant using a first communication device;
   converting the first voice signal and the first body state measurements into first voice data and first body state data;
   converting second voice data and second body state data into a second voice signal and a second body state measurements, wherein the second voice data and the second body state data are received by the first communication device from a second communication device used by the second conversant;
   generating a body state model according to a baseline computational model and the second body state measurements, wherein the body state model represents a body position of the second conversant; and
   audibly providing the second voice signal to the first conversant and visually providing a visual representation of the body state model to the first conversant via a visual display.

48. The method of claim 47 wherein the second voice signal and the body state model are temporally synchronized and provided to the first conversant.

49. The method of claim 47 further comprising generating the baseline computational model according to baseline computational data received from the second communication device.

50. The method of claim 49 wherein generating the baseline computational model comprises generating a general speaker baseline computational model indicative of generalized body specifications.

51. The method of claim 50 wherein generating the baseline computational data includes generating an indicator signifying the general speaker baseline computational model.

52. The method of claim 51 further comprising the communication device utilizing a locally stored version of the general speaker baseline computational model upon receiving the indicator.

53. The method of claim 52 further comprising loading the general speaker baseline computational model manufacturing of the communication device or loading during a device configuration upload.

54. The method of claim 49 wherein generating the baseline computational model includes generating a speaker-specific baseline computational model representative of speaker-specific body specifications corresponding to the second conversant.

55. The method of claim 47 further comprising multiplexing the first voice data and the first body state data prior to transmitting to the second communication device.

56. The method of claim 47 further comprising de-multiplexing a received multiplexed transmission, the multiplexed transmission including the second voice data and the second body state data.

57. The method of claim 47 wherein generating the baseline computational model comprises generating a general speaker baseline computational model representative of generalized body specifications.

58. The method of claim 57 further comprising loading the general speaker baseline computational model during manufacturing of the communication device or loading during a device configuration upload.

59. The method of claim 47 wherein generating the baseline computational model comprises generating an indicator indicating the use of a general speaker baseline computational model.

60. The method of claim 59 further comprising the second communication device utilizing a locally stored version of the general speaker baseline computational model upon receiving the indicator.

61. The method of claim 47 wherein generating the baseline computational model comprises generating a speaker-specific baseline computational model representative of speaker-specific body specifications corresponding to the second conversant.

62. The communication device of claim 61 wherein the speaker-specific baseline computational model adds kinesiological model measurements to a general speaker baseline computational model representative of generalized body specifications.

63. The method of claim 47 further comprising transmitting the baseline computational model from the second communication device to the first communication device at the start of a communication between the first conversant and the second conversant.

64. The method of claim 47 further comprising using one or more sensors to measure the first body state measurements.

65. The method of claim 47 further comprising entering the body state measurements using a keyboard.

66. The method of claim 47 wherein the first communication device and the second communication device each comprise a video game system.

67. The method of claim 66 wherein the video game system comprises a video game console coupled to a display device.

68. The method of claim 66 wherein the video game system comprises a handheld device.

69. An apparatus comprising:
   means for receiving a first voice signal and a first body state measurements from a first conversant using a first communication device;
   means for converting the first voice signal and the first body state measurements into first voice data and first body state data;
   means for converting second voice data and second body state data into a second voice signal and second body state measurements, wherein the second voice data and the second body state data are received by the first communication device from a second communication device used by the second conversant;
   means for generating a body state model according to a baseline computational model and the second body state measurements, wherein the body state model represents a body position of the second conversant;
   means for audibly providing the second voice signal to the first conversant; and
   means for visually providing a visual representation of the body state model to the first conversant via a visual display.

70. A network of devices comprising:
a communication network; and
one or more video game systems coupled together via the communication network, wherein each video game system comprises:
an input/output interface that receives first voice signal and first body state measurements from a first conversant using the video game system;
an encoder circuit that converts the first voice signal and the first body state measurements received by the input/output interface into first voice data and first body state data
a decoder circuit that converts second voice data and second body state data into a second voice signal and second body state measurements, wherein the second voice data and the second body state data are received by the video game system from a second video game system used by a second conversant; and
a body state maintenance circuit to generate a body state model according to a baseline computational model and the second body state measurements, wherein the body state model represents a body position of the second conversant,
wherein the input/output interface audibly provides the second voice signal to the first conversant and visually provides a visual representation of the body state model to the first conversant via a visual display.

71. The network of devices of claim 70 wherein the baseline computational model is generated according to baseline computational data received from the second video game system.

72. The network of devices of claim 71 wherein the baseline computational model comprises a general speaker baseline computational model indicative of generalized body specifications.

73. The network of devices of claim 72 wherein the baseline computational data includes an indicator signifying the general speaker baseline computational model, and upon receiving the indicator, the video game system utilizes a locally stored version of the general speaker baseline computational model.

74. The network of devices of claim 73 wherein the general speaker baseline computational model is loaded during manufacturing of the video game system or loaded during a device configuration upload.

75. The network of devices of claim 71 wherein the baseline computational model comprises a speaker-specific baseline computational model representative of speaker-specific body specifications corresponding to the second conversant.

76. The network of devices of claim 70 wherein the visual representation of the body state model is generated by a visual rendering circuit which accesses the body state model.

77. The network of devices of claim 70 wherein each video game system further comprises a transceiver circuit to transmit the first voice data and the first body state data, and to receive the second voice data, the second body state data, and baseline computational data corresponding to the second video game system.

78. The network of devices of claim 77 wherein the transceiver further comprises a multiplexer to multiplex the first voice data and the first body state data prior to transmission.

79. The network of devices of claim 77 wherein the transceiver further comprises a de-multiplexer to de-multiplex a received multiplexed transmission, the multiplexed transmission including the second voice data and the second body state data.

80. The network of devices of claim 70 wherein the baseline computational model comprises a general speaker baseline computational model representative of generalized body specifications.

81. The network of devices of claim 80 wherein the general speaker baseline computational model is loaded during manufacturing of the video game system or loaded during a video game system configuration upload.

82. The network of devices of claim 70 wherein the baseline computational model comprises an indicator indicating the use of a general speaker baseline computational model such that the second video game system, upon receiving the indicator, utilizes a locally stored version of the general speaker baseline computational model.

83. The network of devices of claim 70 wherein the baseline computational model comprises a speaker-specific baseline computational model representative of speaker-specific body specifications corresponding to the second conversant.

84. The communication device of claim 83 wherein the speaker-specific baseline computational model adds kinesiological model measurements to a general speaker baseline computational model representative of generalized body specifications.

85. The network of devices of claim 70 wherein the baseline computational model is transmitted from the second video game system to the first video game system at the start of a communication between the first conversant and the second conversant.

86. The network of devices of claim 70 wherein each video game system further comprises one or more sensors to measure the first body state measurements.

87. The network of devices of claim 86 wherein at least one sensor is selected from the group consisting of a tilt sensor, a flux gate electronic compass, a microelectromechanical system accelerometer, a microelectromechanical system rate gyro grouping, and a tactile pressure sensor.

88. The network of devices of claim 87 wherein the input/output interface further comprises a means for receiving body state measurement signals from one or more external sensors.

89. The network of devices of claim 70 wherein the first body state measurements are entered by the first conversant using a keyboard.

90. The network of devices of claim 70 wherein the video game system comprises a video game console coupled to a display device.

91. The network of devices of claim 70 wherein the video game system comprises a handheld device.

92. The network of devices of claim 70 wherein the communication network comprises the internet.

93. A video game system to communicate speech and body states of a video game player, the video game system comprising:
an input/output interface that receives a voice signal and body state measurements from a video game player using the video game console;
an encoder circuit that converts the voice signal and the body state measurements received by the input/output interface into voice data and body state data; and
a body state maintenance circuit to generate a body state model according to a baseline computational model and second body state data, wherein the body state model represents a body position of the video game player,
wherein the input/output interface provides a visual representation of the body state model to the video game player via a visual display.

94. The video game system of claim 93 wherein the baseline computational model comprises a general speaker baseline computational model indicative of generalized body specifications.

95. The video game system of claim 94 wherein the general speaker baseline computational model is loaded during manufacturing of the video game system or loaded during a device configuration upload.

96. The video game system of claim 93 wherein the baseline computational model comprises a speaker-specific baseline computational model representative of speaker-specific body specifications corresponding to the video game player.

97. The video game system of claim 93 wherein the visual representation of the body state model is generated by a visual rendering circuit which accesses the body state model.

98. The video game system of claim 93 further comprising one or more sensors to measure the first body state measurements.

99. The video game system of claim 98 wherein at least one sensor is selected from the group consisting of a tilt sensor, a flux gate electronic compass, a microelectromechanical system accelerometer, a microelectromechanical system rate gyro grouping, and a tactile pressure sensor.

100. The video game system of claim 93 wherein the input/output interface further comprises a means for receiving body state measurement signals from one or more external sensors.

101. The video game system of claim 93 wherein the body state measurements are entered by the video game player using a keyboard.

102. The video game system of claim 93 wherein the video game system comprises a video game console coupled to a display device.

103. The video game system of claim 93 wherein the video game system comprises a handheld device.

104. A communication device comprising:
a voice encoding mechanism that converts a voice utterance of a first conversant into first voice data, the first voice data being for receipt and rendering for audible output by a second communication device operated by a second conversant;
a speaker kinesiological modeling data structure that provides a first kinesiologically-based model; and
a body state and data encoding mechanism that uses the first kinesiologically-based model to convert a body state measurement associated with the first conversant into first kinesiological data, the first kinesiological data being for receipt and rendering for visual output by the second communication device via a visual display.

105. The communication device of claim 104, further comprising:
a voice decoding mechanism that converts and renders for audible output second voice data received from the second communication device, the second voice data being associated with the second conversant.

106. The communication device of claim 105, further comprising:
a body state maintenance mechanism that uses the first or a second kinesiologically-based model to convert and render for visual output a body state measurement associated with the second conversant.

107. The communication device of claim 105, further comprising:
a voice decoding mechanism that converts and renders for audible output second voice data received from the second communication device, the second voice data being associated with the second conversant; and
a body state maintenance mechanism that uses the first or a second kinesiologically-based model to convert and render for visual output a body state measurement associated with the second conversant.

108. The communication device of claim 105, wherein the first kinesiological data is associated with computer game play.

109. A communication device comprising:
a voice decoding mechanism that converts and renders for audible output voice data received from a second communication device, the voice data being associated with a conversant operating the second communication device;
a speaker kinesiological modeling data structure that provides a first kinesiologically-based model; and
a body state maintenance mechanism that uses the first kinesiologically-based model to convert and render for visual output via a visual display a body state measurement associated with the second conversant.

110. The communication device of claim 109, further comprising:
a voice encoding mechanism that converts a voice utterance of a second conversant into second voice data, the second voice data being for receipt and rendering for audible output by the second communication device, the second conversant operating the communication device.

111. The communication device of claim 109, further comprising:
a body state and data encoding mechanism that uses the first or a second kinesiologically-based model to convert a body state measurement associated with the second conversant into second kinesiological data, the second kinesiological data being for receipt and rendering for visual output by the second communication device.

112. The communication device of claim 109, wherein the body state measurement associated with the second conversant is associated with computer game play.

113. A communication device comprising:
an input/output interface that receives a first voice signal and first body state measurements from a first conversant using the communication device;
an encoder circuit that converts the first voice signal and the first body state measurements received by the input/output interface into first voice data and first body state data;
a decoder circuit that converts second voice data and second body state data into a second voice signal and second body state measurements, wherein the second voice data and the second body state data are received by the communication device from a second communication device used by a second conversant; and
a body state maintenance circuit to generate a body state model according to a baseline computational model and the second body state measurements, wherein the body state model represents a body position of the second conversant, further wherein the baseline computational model includes aspects of physiognomy, posture and pose of the second conversant,
wherein the input/output interface audibly provides the second voice signal to the first conversant and visually provides a visual representation of the body state model to the first conversant via a visual display.

* * * * *